United States Patent
Wang et al.

(10) Patent No.: US 8,446,675 B1
(45) Date of Patent: *May 21, 2013

(54) IMAGE WAVEGUIDE WITH MIRROR ARRAYS

(75) Inventors: Chia-Jean Wang, Palo Alto, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,151

(22) Filed: Apr. 26, 2012

Related U.S. Application Data

(63) Continuation of application No. 13/078,630, filed on Apr. 1, 2011, now Pat. No. 8,189,263.

(51) Int. Cl.
*G02B 27/14* (2006.01)

(52) U.S. Cl.
USPC .......................................... 359/633; 359/630

(58) Field of Classification Search
USPC ................... 359/13, 629, 630, 633; 348/115
See application file for complete search history.

(56) References Cited

U.S. PATENT DOCUMENTS

| | | |
|---|---|---|
| 4,711,512 A | 12/1987 | Upatnieks |
| 5,076,664 A | 12/1991 | Migozzi |
| 5,715,337 A | 2/1998 | Spitzer et al. |
| 5,724,463 A | 3/1998 | Deacon et al. |
| 5,734,357 A | 3/1998 | Matsumoto |
| 5,886,822 A | 3/1999 | Spitzer |
| 5,943,171 A | 8/1999 | Budd et al. |
| 6,023,372 A | 2/2000 | Spitzer et al. |
| 6,091,546 A | 7/2000 | Spitzer |
| 6,201,629 B1 | 3/2001 | McClelland et al. |
| 6,204,974 B1 | 3/2001 | Spitzer |
| 6,271,808 B1 | 8/2001 | Corbin |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,522,794 B1 | 2/2003 | Bischel et al. |
| 6,538,799 B2 | 3/2003 | McClelland et al. |
| 6,618,099 B1 | 9/2003 | Spitzer |

(Continued)

FOREIGN PATENT DOCUMENTS

| | | |
|---|---|---|
| EP | 1736812 A1 | 12/2006 |
| JP | 2011-118402 | 6/2011 |
| WO | WO 99/46619 A | 9/1999 |
| WO | WO 2010/092409 A1 | 8/2010 |

OTHER PUBLICATIONS

U.S. Notice of Allowance mailed Nov. 1, 2011, U.S. Appl. No. 13/078,630, filed Apr. 1, 2011 (14 pages).

(Continued)

*Primary Examiner* — William Choi
(74) *Attorney, Agent, or Firm* — Blakely Sokoloff Taylor & Zafman LLP

(57) ABSTRACT

An image waveguide includes an in-coupling region for receiving input light into the image waveguide and an out-coupling region for emitting output light from the image waveguide. The in-coupling region includes at least one in-coupling structure orientated to direct the input light into the waveguide for propagation towards the out-coupling region as guided light. The out-coupling region includes a two dimensional array of out-coupling mirror structures orientated to reflect the guided light out of the waveguide as the output light.

22 Claims, 7 Drawing Sheets

U.S. PATENT DOCUMENTS

| | | |
|---|---|---|
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,829,095 B2 | 12/2004 | Amitai |
| 6,879,443 B2 | 4/2005 | Spitzer et al. |
| 6,903,876 B2 | 6/2005 | Okada et al. |
| 7,021,777 B2 | 4/2006 | Amitai |
| 7,158,096 B1 | 1/2007 | Spitzer |
| 7,242,527 B2 | 7/2007 | Spitzer et al. |
| 7,346,260 B2 | 3/2008 | Arakida et al. |
| 7,391,573 B2 | 6/2008 | Amitai |
| 7,457,040 B2 | 11/2008 | Amitai |
| 7,502,168 B2 | 3/2009 | Akutsu et al. |
| 7,513,670 B2 | 4/2009 | Yang et al. |
| 7,545,569 B2 | 6/2009 | Cassarly |
| 7,576,916 B2 | 8/2009 | Amitai |
| 7,577,326 B2 | 8/2009 | Amitai |
| 7,595,933 B2 | 9/2009 | Tang |
| 7,643,214 B2 | 1/2010 | Amitai |
| 7,663,805 B2 | 2/2010 | Zaloum et al. |
| 7,672,055 B2 | 3/2010 | Amitai |
| 7,674,028 B2 | 3/2010 | Cassarly et al. |
| 7,724,441 B2 | 5/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,843,403 B2 | 11/2010 | Spitzer |
| 7,876,489 B2 | 1/2011 | Gandhi et al. |
| 7,900,068 B2 | 3/2011 | Weststrate et al. |
| 8,189,263 B1 | 5/2012 | Wang et al. |
| 2001/0021058 A1 | 9/2001 | McClelland et al. |
| 2001/0022682 A1 | 9/2001 | McClelland et al. |
| 2003/0090439 A1 | 5/2003 | Spitzer et al. |
| 2005/0174651 A1 | 8/2005 | Spitzer et al. |
| 2006/0132914 A1 | 6/2006 | Weiss et al. |
| 2006/0192306 A1 | 8/2006 | Giller et al. |
| 2006/0192307 A1 | 8/2006 | Giller et al. |
| 2007/0047091 A1 | 3/2007 | Spitzer et al. |
| 2007/0103388 A1 | 5/2007 | Spitzer |
| 2008/0002427 A1 | 1/2008 | Kropac et al. |
| 2008/0106775 A1 | 5/2008 | Amitai |
| 2008/0151379 A1 | 6/2008 | Amitai |
| 2008/0186604 A1 | 8/2008 | Amitai |
| 2008/0198471 A1 | 8/2008 | Amitai |
| 2008/0219025 A1 | 9/2008 | Spitzer et al. |
| 2008/0247722 A1 | 10/2008 | Van Gorkom et al. |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0141324 A1 | 6/2009 | Mukawa |
| 2009/0161383 A1 | 6/2009 | Meir et al. |
| 2009/0237804 A1 | 9/2009 | Amitai et al. |
| 2010/0046070 A1 | 2/2010 | Mukawa |
| 2010/0046219 A1 | 2/2010 | Pijlman et al. |
| 2010/0103078 A1 | 4/2010 | Mukawa et al. |
| 2010/0149073 A1 | 6/2010 | Chaum et al. |
| 2010/0157433 A1 | 6/2010 | Mukawa et al. |
| 2010/0171680 A1 | 7/2010 | Lapidot et al. |
| 2010/0278480 A1 | 11/2010 | Vasylyev et al. |
| 2010/0321409 A1 | 12/2010 | Komori et al. |
| 2011/0007277 A1 | 1/2011 | Solomon |
| 2011/0213664 A1 | 9/2011 | Osterhout et al. |

OTHER PUBLICATIONS

U.S. Notice of Allowance mailed Feb. 2, 2012, U.S. Appl. No. 13/078,630, filed Apr. 1, 2011 (9 pages).

Cakmakci, Ozan et al., "Head-Worn Displays: A Review", Journal of Display Technology, Sep. 2006, 20 pages, vol. 2, Issue 3.

Mukawa, Hiroshi et al., "8.4: Distinguished Paper: A Full Color Eyewear Display using Holographic Planar Waveguides", SID Symposium Digest of Technical Papers, May 2008, pp. 89-92, vol. 39, Issue 1.

Levola, Tapani, "Diffractive Optics for Virtual Reality Displays", Academic Dissertation, University of Joensuu, Department of Physics, Vaisala Laboratory, 2005, 26 pages.

Takahashi, Christopher et al., "Polymeric Waveguide Design of a 2D Display System", Proceedings of SPIE, 2006, vol. 6177, 617719, 9 pages.

Aye, Tin M., "Miniature Guided Light Array Sequential Scanning Display for Head Mounted Displays", U.S. Army CECOM, May 15, 2008, 35 pages.

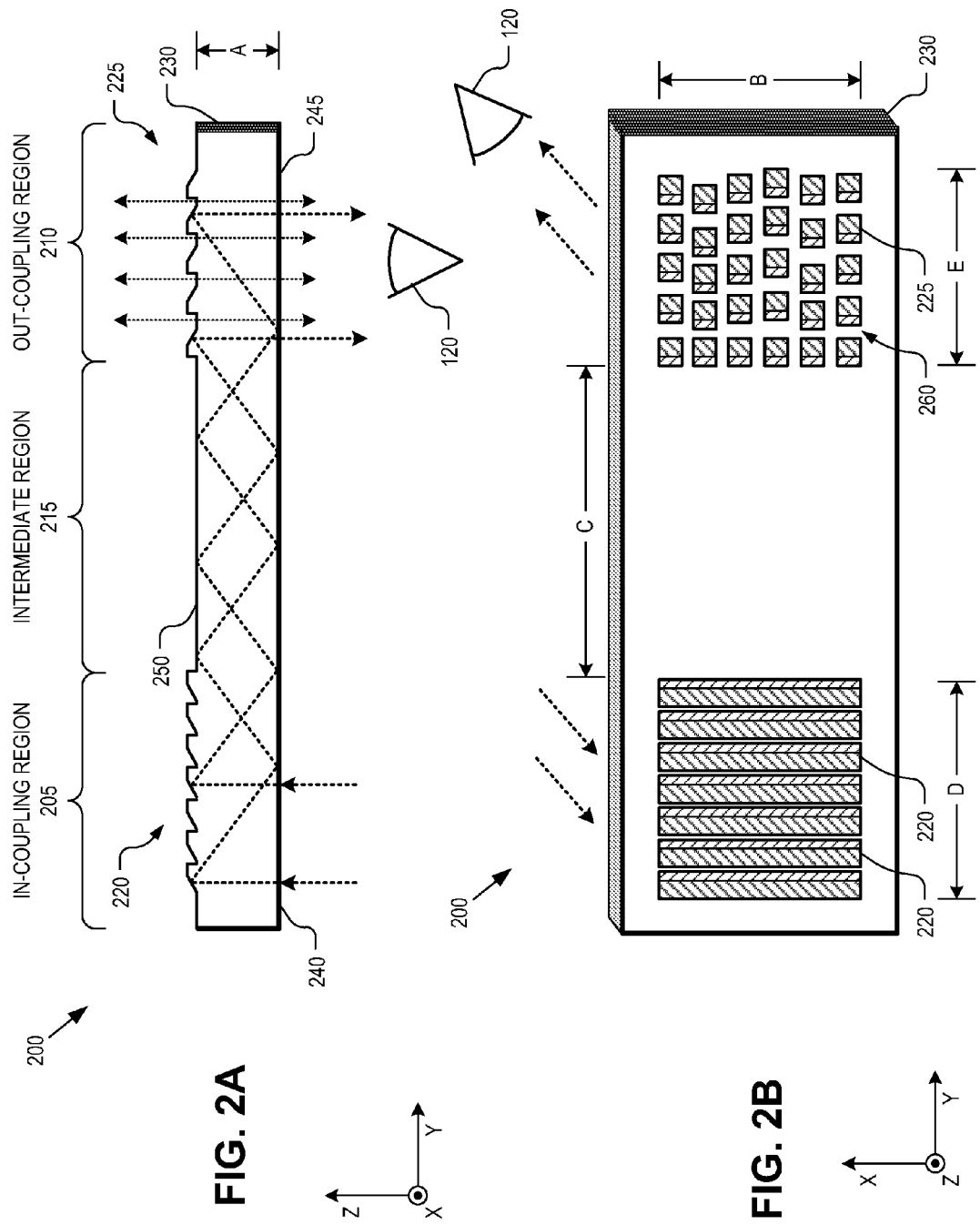

US 8,446,675 B1

IMAGE WAVEGUIDE WITH MIRROR ARRAYS

CROSS-REFERENCE TO RELATED APPLICATION

The present patent application is a continuation of U.S. application Ser. No. 13/078,630, filed on Apr. 1, 2011.

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, field of view, and efficiency of conventional optical systems used to implemented existing HMDs.

SUMMARY

Implementations of techniques, apparatuses, and systems are provided for a waveguide. In one aspect, the waveguide includes first and second surfaces, an in-coupling region for receiving input light into the waveguide, and an out-coupling region for emitting output light from the waveguide out the second surface; at least one in-coupling structure disposed in or on the waveguide at the in-coupling region of the waveguide and orientated to direct the input light for propagation within the waveguide towards the out-coupling region as guided light; and a two dimensional ("2D") array of out-coupling mirror structures disposed in or on the waveguide at the out-coupling region of the waveguide and orientated to reflect the guided light out of the waveguide as the output light.

These and other aspects and embodiments are described in detail in the drawings, the description, and the claims.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 2A is a cross-sectional view illustrating an image waveguide with minor arrays for generating a near-to-eye image, in accordance with an embodiment of the invention.

FIG. 2B is a front perspective view illustrating the image waveguide with mirror arrays for generating a near-to-eye image, in accordance with an embodiment of the invention.

DETAILED DESCRIPTION

Embodiments of an apparatus, system and method for fabrication of a waveguide with embedded mirrors are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
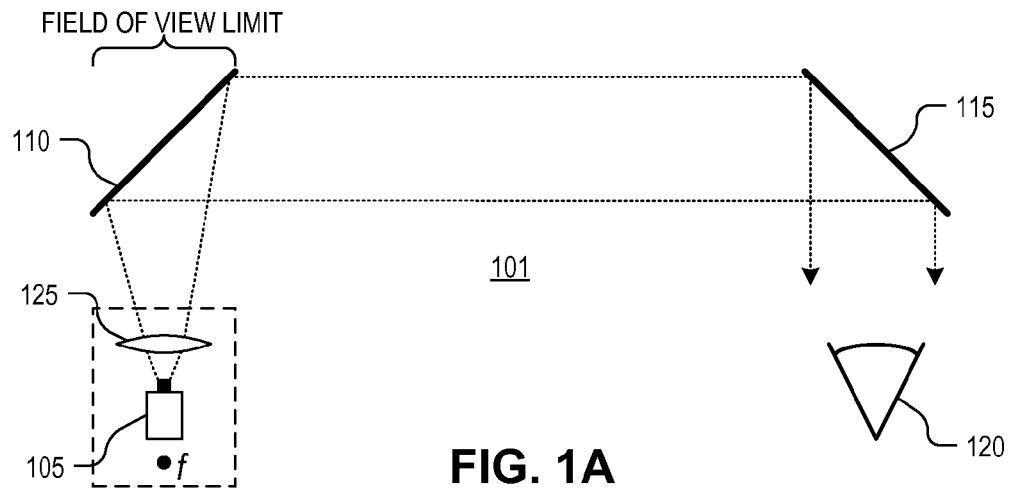
FIG. 1A illustrates a first conventional near-to-eye optical system using an input lens and two minors.

FIG. 1A illustrates a first conventional near-to-eye optical system 101 using an input lens and two minors. An image source 105 outputs an image that is reflected by two minors 110 and 115, which form an image near to eye 120. Image source 105 is typically mounted above the head or to the side of the head, while minors 110 and 115 bend the image around the front of the viewer's face to their eye 120. Since the human eye is typically incapable of focusing on objects placed within a few centimeters, this system requires a lens 125 interposed between the first minor 110 and image source 105. Lens 125 creates a virtual image that is displaced further back from the eye than the actual location of minor 115 by positioning image source 105 inside of the focal point f of lens 125. Optical system 101 suffers from a relatively small field of view (e.g., approximately 20 degrees) limited by the extent of mirrors 110 and 115 and the bulkiness of lens 125. The field of view can be marginally improved by placing minors 110 and 115 within a high index material to compress the angles of incidence, but is still very limited and the thickness of the waveguide rapidly increases to achieve larger fields of view.

Figure 1B:
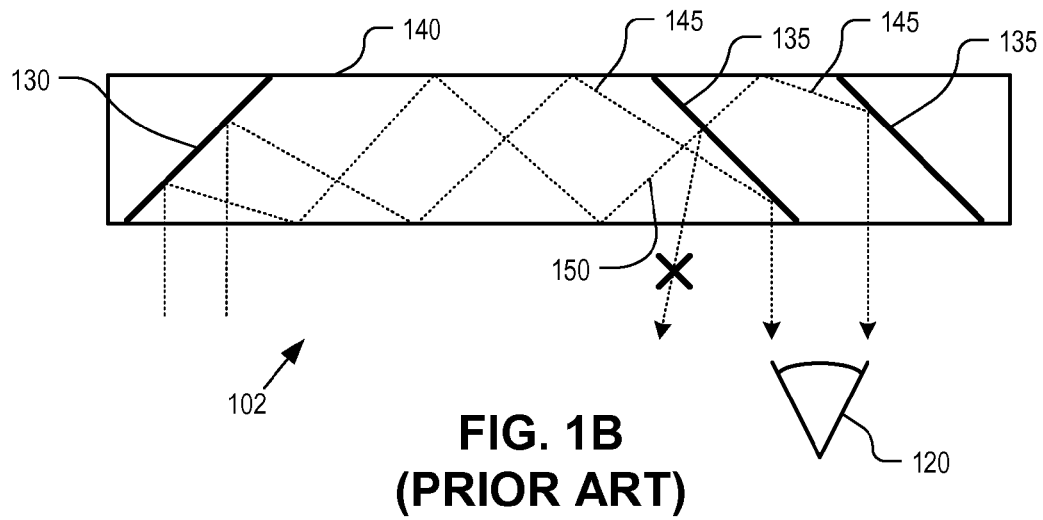
FIG. 1B illustrates a second conventional near-to-eye optical system using angle sensitive dichroic minors.

FIG. 1B illustrates a second conventional near-to-eye optical system 102 using angle sensitive dichroic minors. Optical system 102 includes a single in-coupling minor 130 and two out-coupling dichroic mirrors 135 disposed within a waveguide 140. This system uses collimated input light from virtual images placed at infinity. In order to produce a useful image at eye 120, each incident angle of input light should correspond to a single output angle of emitted light. Since light can potentially reflect off of output minors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, the nature of dichroic mirrors 135 that passes some incident angles while reflecting others limits the field of view optical system 102 and the dichroic minor coating does not provide sharp angular cutoffs, resulting in ghosting effects.

Figure 1C:
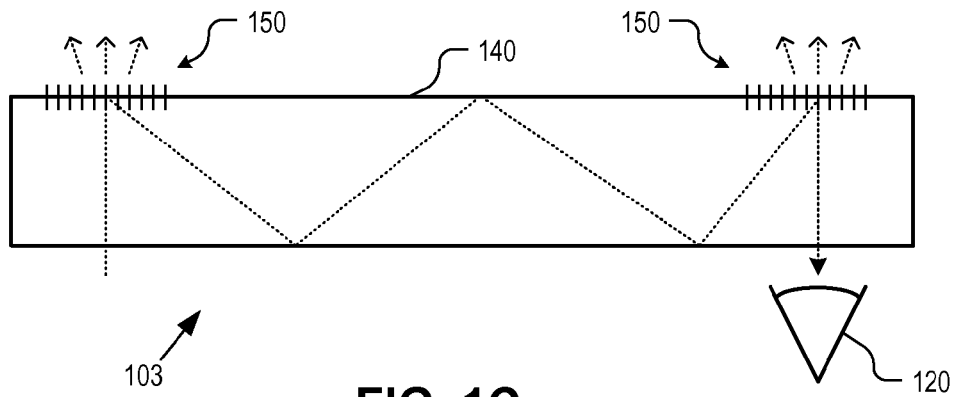
FIG. 1C illustrates a third conventional near-to-eye optical system using holographic diffraction gratings.

FIG. 1C illustrates a third conventional near-to-eye optical system 103 using holographic diffraction gratings. Optical system 103 is similar to optical system 102, but uses holographic diffraction gratings 150 in place of minors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is often difficult and costly. Again, optical system 103 suffers from a limited field of view.

FIGS. 2A and 2B illustrate an image waveguide 200 with one-dimensional ("1D") and two-dimensional ("2D") minor arrays for generating a near-to-eye image, in accordance with an embodiment of the invention. FIG. 2A is a cross-sectional view while FIG. 2B is a front perspective view of the same. The illustrated embodiment of image waveguide 200 includes an in-coupling region 205, an out-coupling region 210, and an intermediate region 215. The illustrated embodiment of in-coupling region 205 includes in-coupling mirror structures 220. The illustrated embodiment of out-coupling region 210 includes out-coupling mirror structures 225 and end cap surface 230. In the illustrated embodiment, image waveguide 200 is a single waveguide substrate (e.g., planar waveguide) that receives input light and emits output light from the same side surface of the waveguide substrate.

Image waveguide 200 operates by receiving collimated input light into image waveguide 200 at in-coupling region 205. In-coupling mirror structures 205 are orientated to reflect the input light through image waveguide 200 towards out-coupling region 220. The reflected input light is guided towards out-coupling region 210 by intermediate region 215. In-coupling mirror structures 220 include reflective surfaces that are angled oblique to light incident surface 240. In one embodiment, in-coupling minor structures 220 each include at least one reflective surface angled relative to the input light and sides of image waveguide 200 such that the reflected input light strikes the sides of image waveguide 200 with sufficiently oblique angles that it is guided within image waveguide 200 via total internal reflection ("TIR"). In one embodiment, one or more metallic reflective layers (not illustrated) are coated along the sides of image waveguide 200, including intermediate region 215, to guide the light without need of TIR. A combination of both TIR and metallic reflective coatings may also be used. The guided light eventually reaches out-coupling region 210 where it is once again reflected by out-coupling minor structures 225. Out-coupling mirror structures 225 are orientated to reflect the guided light for exit out emission surface 245 within out-coupling region 210 towards eye 120. In one embodiment, each out-coupling mirror structure 225 includes at least one reflective surface that is orientated such that the guided light received from intermediate region 215 strikes the side of image waveguide 200 with an angle sufficiently close to normal such that the light is output from image waveguide 200 towards eye 120.

Image waveguide 200 may be fabricated of a variety of optically transmissive, light guiding materials, such as polymer, quartz, glass, etc. In one embodiment that uses TIR to guide light through intermediate region 215, image waveguide 200 is fabricated of a polymer material having an index of refraction of approximately 1.5. The dimensions of image waveguide 200 may be adjusted for a particular application; however, one example dimension set includes A≈1 mm, B≈40 mm, C≈30 mm, D≈7.5 mm, E≈8.5 mm. Of course, other dimensions may be used and may vary based on application, aesthetic design choices, intended user size, etc. In some embodiments, the center-to-center separation distance between the array of in-coupling minor structures 220 and the array of out-coupling minor structures 225 is configured to match an average inter-pupillary distance of all users, children users, or adult users. It should be appreciated that the figures are not drawn to scale.

The illustrated embodiment of in-coupling region 205 includes a continuous 1D array of in-coupling mirror structures 225 each for reflecting a different portion of the input light image. FIGS. 2A and 2B illustrates the 1D array as a series of elongated in-coupling mirror structures 220 each having at least one rectangular flat/planar reflective surface orientated obliquely to light incident surface 240. In-coupling minor structures 220 may each be the same length and width or have a variable length and width. In-coupling minor structures 220 may be disposed immediately adjacent to each other substantially without intervening or interstitial gaps between adjacent members, or off-set with interstitial gaps. These structures may be fabricated as raised mirror structures that rise up from a planar surface (such as front side surface 250) in the Z-axis. However, it should be appreciated that in-coupling minor structures 220 may also be embedded within in-coupling region 205 in a variety of other configurations. For example, in-coupling mirror structures 220 maybe encased or back filled within a planarization layer for protection. In the illustrated embodiment, in-coupling minor structures 220 have a substantially trapezoidal cross-section (e.g., see FIG. 3). However, embodiments of in-coupling mirror structures 220 may be implemented with other structures having different cross-sectional shapes and one or more flat reflective surfaces. For example, in-coupling mirror structures 220 may be fabricated with a raised triangular cross-section having just one reflective surface that is obliquely orientated to light incident surface 240 and/or front side surface 250. Furthermore, although FIGS. 2A and 2B illustrate seven in-coupling mirror structures 220, embodiments may be implemented with fewer or greater numbers of in-coupling mirror structures 220 (e.g., 33 continuous in-coupling mirror structures).

Although FIGS. 2A and 2B illustrate in-coupling region 205 as including a 1D array of in-coupling mirror structures, in alternative embodiments, the 1D array within in-coupling region 205 can be replaced with a 2D array of in-coupling minor structures (not illustrated). This alternative 2D array of in-coupling mirror structures may be implemented as a continuous 2D array of mirror structures having substantially no interstitial gaps between adjacent minor structures. In yet other embodiments, the 2D array of in-coupling minor structures may include interstitial gaps in one or two dimensions between adjacent in-coupling minor structures.

Out-coupling region 210 includes a 2D array of out-coupling minor structures 225 each for reflecting a different portion of the guided light for emission from image waveguide 200. FIGS. 2A and 2B illustrate each out-coupling mirror structure 225 as having two rectangular flat/planar reflective surfaces: one orientated obliquely to emission surface 245 and the other orientated substantially parallel with emission surface 245. These structures may be fabricated as raised minor structures that rise up from a planar surface (such as front side surface 250) in the Z-axis. In the illustrated embodiment, the in-coupling and out-coupling mirror structures do not extend into the waveguide along the z-axis, but rather rise up from front side surface 250. However, it should be appreciated that out-coupling mirror structures 225 may also be embedded within out-coupling region 210 in a variety of other configurations, as long as, they are offset from one another to each reflect a different portion of the guided light. For example, out-coupling mirror structures 225 maybe encased or back filled within a planarization layer for protection. In one embodiment, the planarization layer that overlays the 2D array may also include anti-reflective ("AR") properties. In one embodiment, the out-coupling mirror structures have a substantially trapezoidal cross-section (e.g., see FIG. 4A). However, embodiments of out-coupling minors 225 may be implemented with other structures having different cross-sectional shapes and one or more flat reflective surfaces. Furthermore, although FIGS. 2A and 2B illustrate 30 out-coupling minor structures 225, embodiments may be implemented with fewer or greater numbers of offset out-coupling minor structures 225 (e.g., 25 wedges along the Y-axis and 17 wedges along the X-axis for a total of 425 out-coupling minor structures). In one embodiment, in-coupling minor structures 220 of the 1D array have an elongated height (dimension B) that is substantially equivalent to an overall height of the 2D array along the X-axis.

As discussed in further detail below, in one embodiment, the inter-wedge spacing between out-coupling minor structures 225 may vary periodically or aperiodically along the Y-axis while remaining constant along the X-axis. The spacing or interstitial gaps between adjacent out-coupling mirror structures 225 may be selected to permit external light to pass through image waveguide 200 between out-coupling minor structures 225 and reach the eye 120. In this regard, out-coupling region 210 is partially transparent and eye 120 is able to see a real world image from the external light passing through image waveguide 200 augmented by another image guided through image waveguide 200. The other image may typically be CGI for superimposing over a user's real world vision. The degree of transparency may be controlled based on a ratio of areas of out-coupling mirror structures 225 and intervening gaps 260 between out-coupling minor structures 225.

End cap surface 230 inhibits backward reflections propagating towards in-coupling region 205 by discouraging reflections off the right distal end of image waveguide 200. In one embodiment, end cap surface 230 is implemented as a light absorbing surface (e.g., a dark matte surface). In one embodiment, end cap surface 230 is implemented as a light scattering surface (e.g., a rough, diffusive surface). In one embodiment, end cap surface 230 is an AR surface/coating to permit guided light that reaches the distal end to pass out of the waveguide with reduced back reflections. Of course, end cap surface 230 may include combinations of the above possible embodiments.

In one embodiment, waveguide 200 may be fabricated as a single piece planar waveguide having surface 250 along which in-coupling minor structures 220 and out-coupling mirror structures 225 are disposed. In the illustrated embodiment, surface 250 is substantially parallel and opposite to surfaces 240 and 245 through which the input light enters and the output light is emitted. In one embodiment, waveguide 200 is a single piece injection molded planar waveguide.

Figure 3:
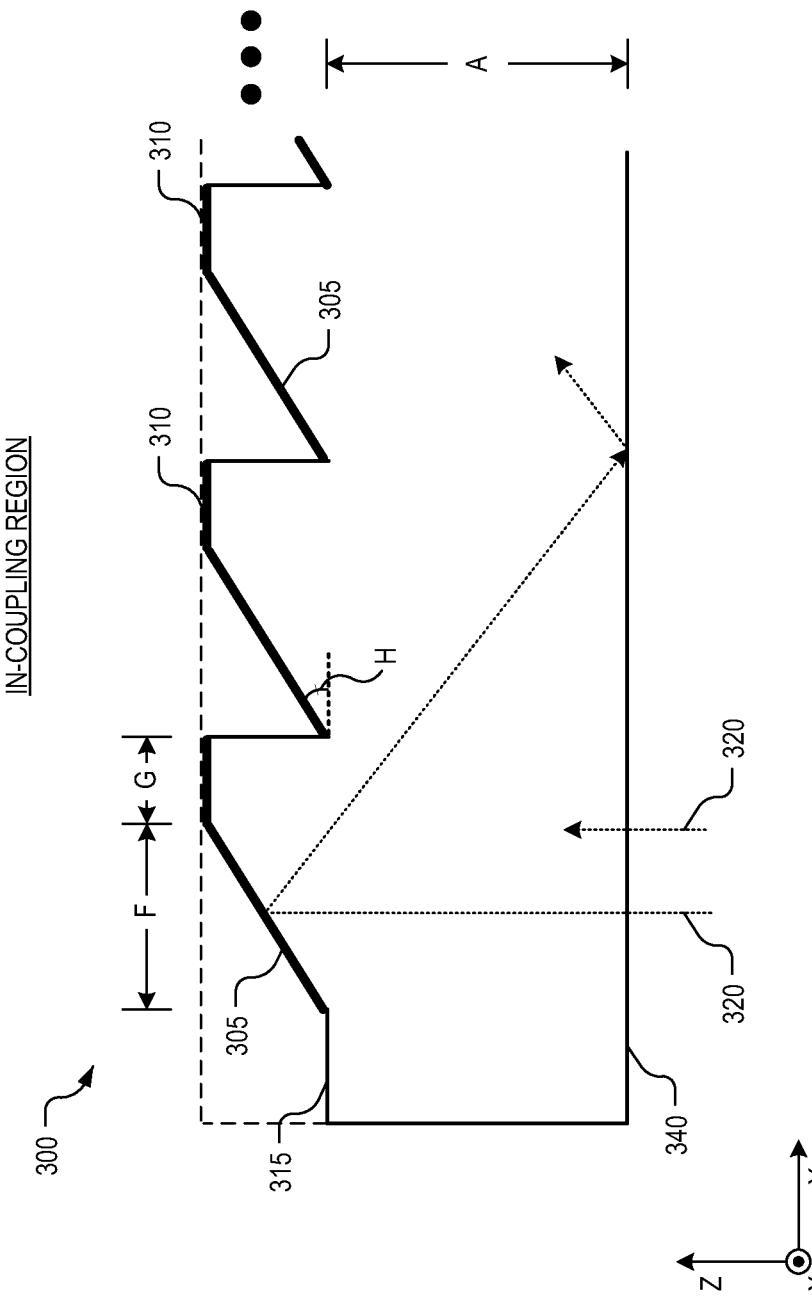
FIG. 3 is a top view illustrating an in-coupling region, in accordance with an embodiment of the invention.

FIG. 3 is a top view illustrating in-coupling mirror structures 300, in accordance with an embodiment of the invention. In-coupling mirror structures 300 represent one possible implementation of in-coupling mirror structures 220. The illustrated embodiment of in-coupling mirror structures 300 each have a substantially trapezoidal cross-section with a flat reflective surface 305 orientated obliquely to light incident surface 340 and a flat surface 310 orientated substantially parallel to light incident surface 340. These structures are disposed along a planar surface 315 and laterally offset from one another to reflect a different portion of input light 320. Although the illustrated embodiment is a continuous 1D array of in-coupling minor structures 300 with substantially no intervening gaps, in other embodiments inter-wedge gaps may be included.

In one embodiment, surfaces 305 and 310 are reflective, non-optically-transmissive surfaces. For example, surfaces 305 and 310 may be fabricated with a reflective metal film, such as, aluminum, nickel, gold, chromium, tin, or otherwise. In one embodiment, reflective surface 305 is coated with a non-optically transmissive reflective layer (e.g., metallic coating), while surface 310 is not. In another embodiment, reflective surfaces 305 and 310 are index of refraction interfaces that reflect light via TIR. In yet another embodiment, surface 310 is omitted (e.g., triangular cross-section of in-coupling mirror structures 300) or coated with an AR material so that it is substantially not reflective, but rather passes input light 320 incident upon surface 310 with a substantially normal trajectory to surface 310.

The dimensions of in-coupling minor structures 300 may be adjusted for a particular application; however, an example dimension set includes F≈174 μm, G≈52 μm, and H≈30°. Of course, other dimensions/angles may be used. It should be appreciated that the figures are not drawn to scale. The inter-wedge separation spacing may be selected for a variety characteristics, including image resolution, image brightness, transparency of in-coupling region, etc. However, an additional consideration is based upon the expected incident angles of input light 320 and angle H.

Figure 4A:
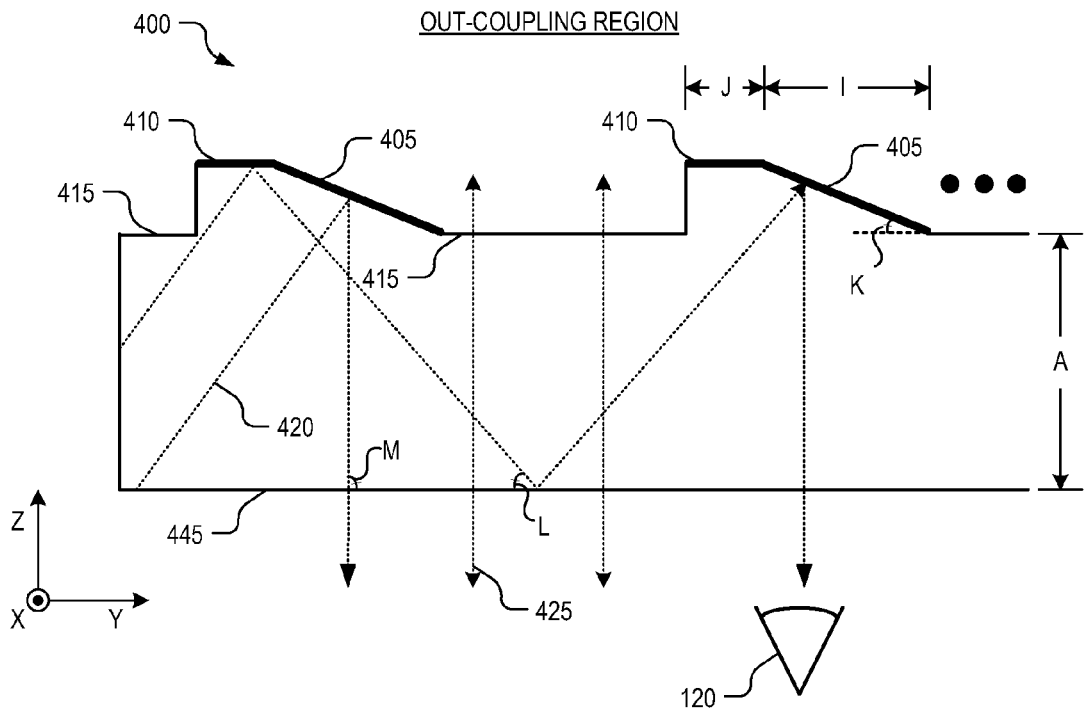
FIG. 4A is a top view illustrating an out-coupling region, in accordance with an embodiment of the invention.
Figure 4B:
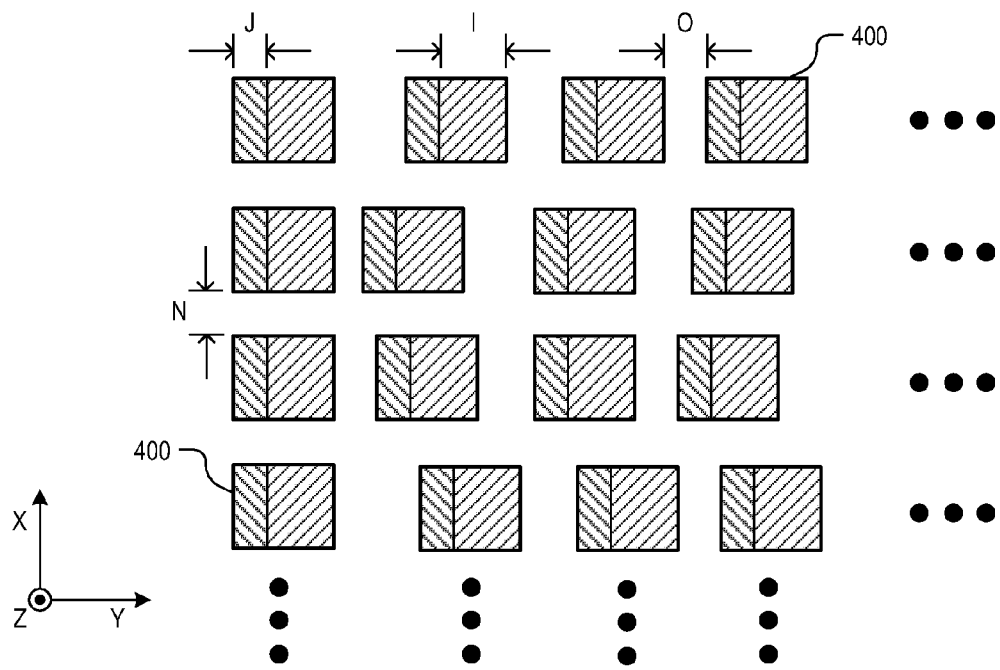
FIG. 4B is a side view of a portion of the out-coupling region, in accordance with an embodiment of the invention.

FIGS. 4A and 4B illustrate a discrete 2D array of out-coupling mirror structures 400, in accordance with an embodiment of the invention. Out-coupling mirror structures 400 represent one possible implementation of out-coupling minor structures 225 illustrated in FIGS. 2A and 2B. The illustrated embodiment of out-coupling minor structures 400 each have a trapezoidal cross-section with two flat reflective surfaces: surface 405 orientated obliquely to emission surface 445 and surface 410 orientated substantially parallel with emission surface 445. These discrete structures are disposed along, and rise up from, a planar surface 415 and offset from one another to reflect a different portion of guided light 420. In one embodiment, reflective surfaces 405 and 410 are non-optically-transmissive surfaces. For example, reflective surfaces 405 and 410 may be fabricated as a reflective metal film, such as, aluminum, nickel, gold, chromium, tin, or otherwise. In one embodiment, reflective surfaces 405 and 410 are fabricated using a dichroic film, which enables wavelength selectivity for specific transmission and reflection behavior. In another embodiment, reflective surfaces 405 and 410 are index of refraction interfaces that reflect light via TIR. The dimensions of out-coupling mirror structures 400 may be adjusted for a particular application; however, an example dimension set may include I≈174 μm, J≈52 μm, and K≈30°. Of course, other dimensions/angles may be used. It should be appreciated that the figures are not drawn to scale.

In the illustrated embodiment of out-coupling mirror structures 400, reflective surface 410 is provided to increase the field of view and spread the output light over a greater extent of emission surface 445. As guided light 420 propagates down image waveguide 200 from intermediate region 215 into out-coupling region 210, some rays will immediately strike one of the oblique reflective surfaces 405 located closer to intermediate region 215. These light rays are reflected with an angle of incidence (angle M) sufficiently large (or sufficiently close to normal with respect to emission surface 445) that they exit image waveguide 200 towards eye 120 as the output light. However, other rays of guided light 420 entering into out-coupling region 210 from intermediate region 215 strike one of the substantially parallel reflective surfaces 410. These rays are reflected with an angle of incidence (angle L) sufficiently small that they are reflected off emission surface 445 and continue propagating down out-coupling region 210 until they strike an oblique reflective surface 405 and exit image waveguide 200. Thus, the output light is laterally extended over a larger area of emission surface 445. Reflective surfaces 410 operate to increase the output efficiency of image waveguide 200 and extend the emission field of view and eye box (e.g., 15° field of view and 5×10 mm eyebox). In this manner, oblique reflective surfaces 405 may be thought of as exit mirrors while substantially parallel reflective surfaces 410 may be thought of as propagation mirrors.

In one embodiment, out-coupling region 210 is partially transparent to pass external light 425 through surfaces 415 and 445 to eye 120. Since reflective surfaces 405 and 410 may be fabricated of non-optically-transmissive material, the degree of transparency of out-coupling region 210 can be adjusted by appropriate selection of dimensions O and N (see FIG. 4B) between adjacent out-coupling mirror structures 400 and/or adjustment of dimensions J and I of the mirror structures themselves. By increasing the proportion of unobstructed surface 415 that falls between out-coupling mirror structures 400, the transparency of out-coupling region 210 can be increased. In one embodiment, an AR coating may be applied to planar surface 415 in the out-coupling region 210 to reduce reflections of external light 425 when entering image waveguide 200.

Referring to FIG. 4B, the 2D array of out-coupling mirror structures 400 may be spaced according to a variety of different schemes. In one embodiment, the vertical spacing M may be a constant value (e.g., N≈100 μm), while the horizontal spacing O may vary. The variable horizontal spacing may change in a periodic pattern or an aperiodic pattern. For example, in one embodiment, horizontal spacing O starts at 150 μm and decrements by 5 μm for each consecutive wedge until O reaches 100 μm, and then starts back at 150 μm. Of course other start, stop, and decrement values may be used. In the illustrated embodiment, the aperiodic spacing pattern continues from the last wedge in an immediately previous row to the first wedge of the next row. Thus, while the leftmost wedge in each row begins at the same lateral position, the spacing after the first wedge begins where the pattern spacing of the last wedge in the previous row finished. Of course, in other embodiments, the first wedge in each row need not be aligned to the same starting point and/or the variable spacing may restart on each row. In other embodiments, both vertical and/or horizontal spacing can be constant, random, periodic, or aperiodic, and other spacing schemes may be implemented as well. However, in general, one benefit to selecting a variably changing spacing is to eliminate the perception of a repeating pattern in the output light image, while also permitting external light to pass through out-coupling region 210 to eye 120.

Although FIGS. 4A and 4B illustrates each out-coupling mirror structure 400 as being replicas of each other, in some embodiments, the size, shape, and pitch (i.e., angle of obliqueness) may vary per mirror structure, per row of the 2D array, per column of the 2D array, per localized region of the 2D array or otherwise. These variants in size, shape, and pitch may be selected to enhance resolution or brightness of the reflected CGI image at the center or peripheral of the 2D array. Such design variations may be implemented to provide an overall even CGI image or to increase resolution at the center of the user's field of view where eye acuity is greatest. Thus, in one embodiment, the density of mirror structures may be increased in the center of the 2D array relative to the periphery to improve center resolution or reciprocally increased at the periphery of the 2D array relative to the center to improve peripheral vision of the CGI image guided by image waveguide 200 (assuming alignment between the center of the 2D array and the natural eye position).

Figure 5:
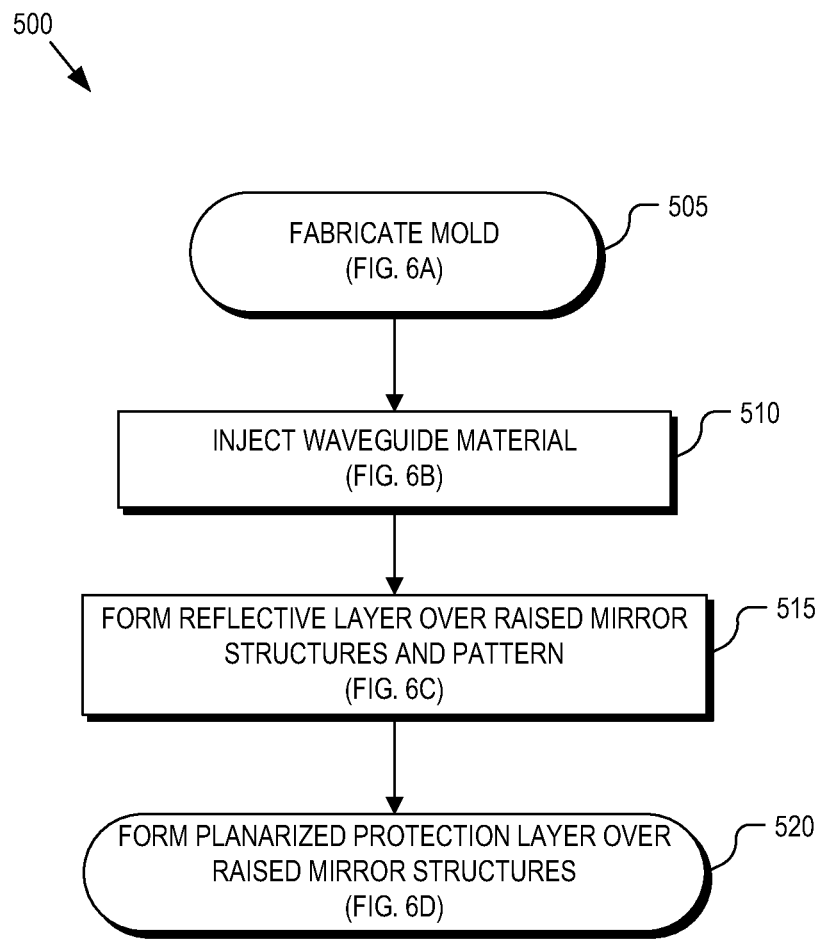
FIG. 5 is a flow chart illustrating an example process for fabricating an image waveguide with minor arrays, in accordance with an embodiment of the invention.
Figure 6A:
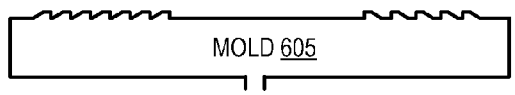
FIGS. 6A-D illustrate the example process for fabricating an image waveguide with minor arrays, in accordance with an embodiment of the invention.
Figure 6B:
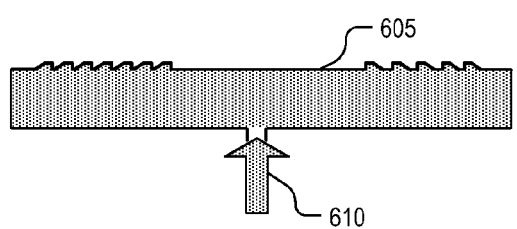
Figure 6C:
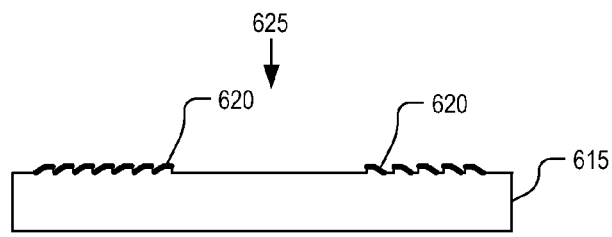
Figure 6D:
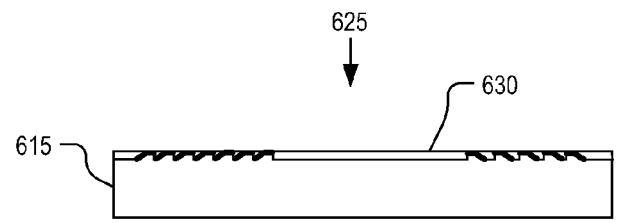

FIG. 5 is a flow chart illustrating an example process 500 for fabricating image waveguide 200, in accordance with an embodiment of the invention. Process 500 describes an injection molding fabrication process using thermal plastics. However, one of ordinary skill in the art of waveguide fabrication will appreciate that other fabrication techniques may used. For example, photolithography and multiple flood exposures may be used to pattern the 1D and 2D arrays onto the surface of a waveguiding substrate.

Process 500 is described with reference to FIGS. 6A-D. The order in which some or all of the process blocks appear in process 500 should not be deemed limiting. Rather, one of ordinary skill in the art having the benefit of the present disclosure will understand that some of the process blocks may be executed in a variety of orders not illustrated.

In a process block 505, a metal injection mold 605 is fabricated. The inside surfaces of mold 605 includes the surface features necessary to form the raised in-coupling and out-coupling mirror structures. In a process block 510, a polymer or thermal plastic 610 is injected into the mold at an elevated temperature that permits the polymer or thermal plastic to flow and assume the internal shape of mold 605. Mold 605 is cooled causing the thermal plastic to harden. In one embodiment, the thermal plastic is a polymer material with an index of refraction of approximately 1.5. Once cooled, mold 605 is opened and the waveguide member 615 extracted.

In a process block 515, surfaces 620 are coated with a non-optically transmissive reflective material (e.g., metal). In one embodiment, a metal layer may be disposed over the entire side 625 of waveguide member 615 and then patterned using lithograph and the excess material washed away using liftoff techniques leaving just surfaces 620 covered. In one embodiment, intermediate region 215 may also be coated with metal to augment the light guiding characteristics within this region. In some embodiments that use TIR exclusively for all reflective surfaces, process block 515 may be skipped.

Finally, in a process block 520, a planarized protection layer 630 may be disposed over side 625 to protect the 1D and 2D arrays. Planarized protection layer 630 may be formed of the same material as waveguide member 615 (e.g., when surfaces 620 are coated with metal) or formed of another transparent material having a different index of refraction than the waveguide member 615. Planarized protection layer 630 may be planarized using a chemical mechanical polishing ("CMP"). In one embodiment, planarized protection layer 630 also operates as an AR layer or alternatively is coated with an AR coating. In yet another embodiment, planarized protection layer 630 is a complementary molded piece with a planar top surface that fits over the raised mirror structures. Of course, process block 520 is also optional.

Figure 7:
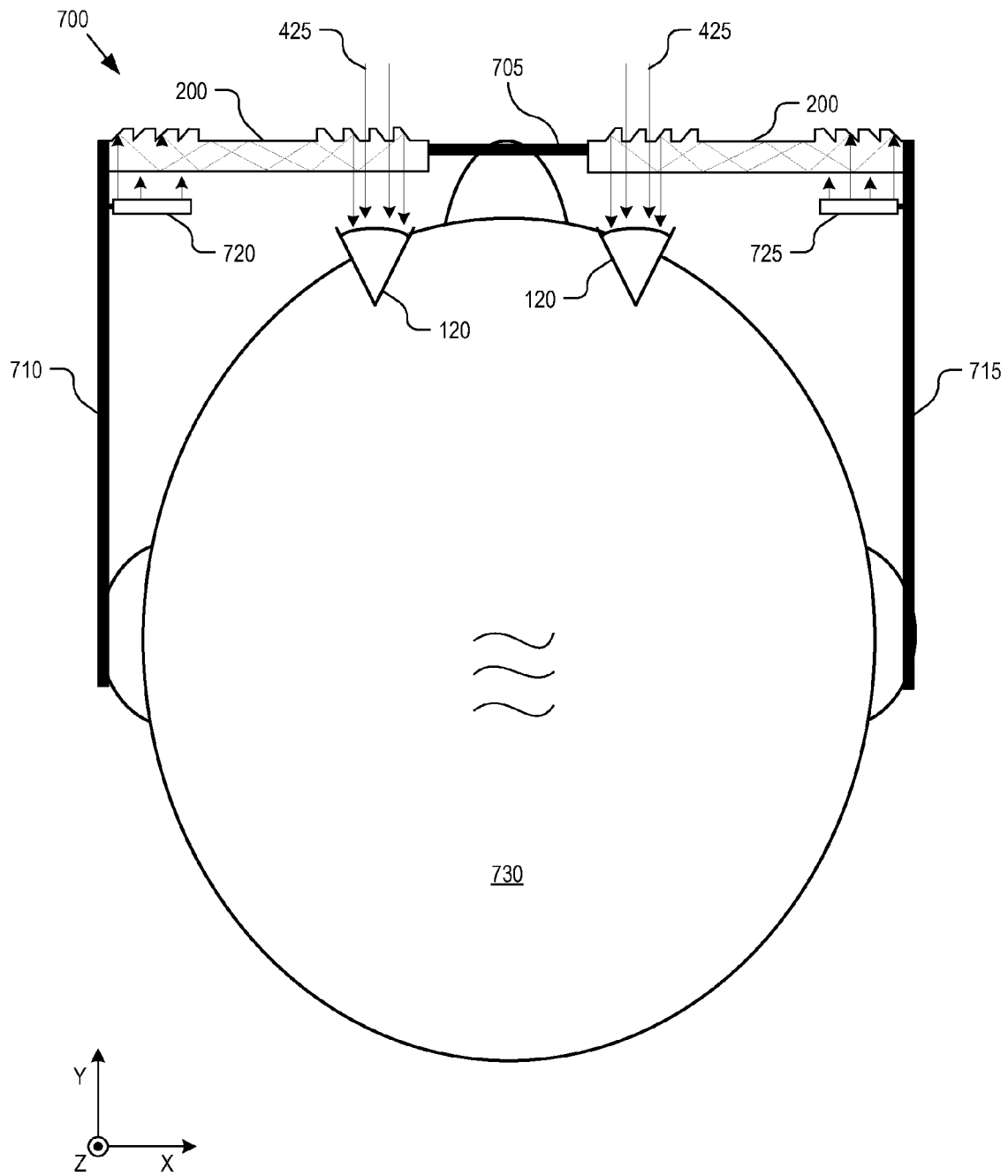
FIG. 7 is a top view of a near-to-eye imaging system using two image waveguides each with minor arrays, in accordance with an embodiment of the invention.

FIG. 7 is a top view of a demonstrative near-to-eye imaging system 700, in accordance with an embodiment of the invention. The illustrated embodiment of imaging system 700 includes two image waveguides 200, a frame including a nose assembly 705, left ear assembly 710, and right ear assembly 715, and two image sources 720 and 725.

The two image waveguides 200 are secured into an eye glass arrangement that can be worn on a head 730 of a user. The left and right ear assemblies 710 and 715 rest over the user's ears while nose assembly 705 rests over the user's nose. The frame assembly is shaped and sized to position out-coupling region 210 of each image waveguide 200 in front of a corresponding eye 120 of the user with the emission surfaces facing eyes 120.

The illustrated embodiment is capable of displaying an augmented reality to the user. As such, out-coupling region 210 of each image waveguide 200 is partially transparent and permits the user to see a real world image via external light 425. Left and right (binocular embodiment) CGIs are generated by image sources 720 and 725, respectively. In one embodiment, image sources 720 and 725 are liquid crystal on silicon ("LCoS") based pico-projectors that use laser diodes or LEDs and emit collimated light. Of course, other display technology may be used. The CGI output by image sources 720 and 725 is launched into their respective image waveguides 200 at in-coupling regions 205, guided through intermediate regions 215, and emitted from out-coupling regions 210 near-to-eyes 120. Since image waveguides 200 preserve a one-to-one relation of input light angles to output light angles, the output light is also collimated and therefore virtually projected at near infinity. Although the human eye is typically incapable of bring objects within a few centimeters into focus, since the output light is virtually displayed at near infinity, the image is readily in focus. The CGI is seen by the user as a virtual image superimposed over the real world as an augmented reality.

Although FIG. 7 illustrates image sources 720 and 725 as projecting images normal to image waveguides 200, in other embodiments, optical elements (e.g., lenses, minors, etc.) may be placed between image sources 720 and 725 and image waveguides 200, such that the CGI light may be launched into in-coupling regions 205 at oblique angles.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus, comprising:
   a waveguide including first and second surfaces, the waveguide including an in-coupling region for receiving input light into the waveguide and an out-coupling region for emitting output light from the waveguide out the second surface;
   at least one in-coupling structure disposed in or on the waveguide at the in-coupling region of the waveguide and orientated to direct the input light for propagation within the waveguide towards the out-coupling region as guided light; and
   a two dimensional ("2D") array of out-coupling minor structures disposed in or on the waveguide at the out-coupling region of the waveguide and orientated to reflect the guided light out of the waveguide as the output light.

2. The optical apparatus of claim 1, further comprising a one dimensional ("1D") array of in-coupling mirror structures, including the at least one in-coupling structure, disposed in or on the waveguide at the in-coupling region.

3. The optical apparatus of claim 2,
   wherein the 1D and 2D arrays both comprise raised minor structures that are disposed on and rise from the first surface of the waveguide opposite to the second surface of the waveguide through which the input light is incident and the output light is emitted,
   wherein the raised mirror structures of the 1D array are laterally offset from each other along the first surface in a first dimension to each reflect a different portion of the input light, and
   wherein the raised mirror structures of the 2D array are laterally offset from each other along the first surface in the first dimension and a second dimension.

4. The optical apparatus of claim 3, wherein each of the raised minor structures of at least one of the 1D array or the 2D array comprises:
   a first reflective surface orientated obliquely to the second surface; and
   a second reflective surface orientated substantially parallel to the second surface.

5. The optical apparatus of claim 4, wherein at least one of the first or second reflective surfaces comprises a metallic layer disposed on the raised mirror structures of the at least one of the 1D or 2D arrays.

6. The optical apparatus of claim 3, further comprising a planarization layer fitted over the 1D and 2D arrays and the first surface of the waveguide, wherein the planarization layer comprises a molded element having a complementary surface that fits to the raised mirror structures of the 1D and 2D arrays.

7. The optical apparatus of claim 2, wherein the in-coupling mirror structures of the 1D array are disposed in columns substantially without interstitial gaps along a plane.

8. The optical apparatus of claim 1, wherein the out-coupling minor structures have a variable spacing between adjacent ones of the out-coupling minor structures along a first axis of the 2D array.

9. The optical apparatus of claim 8, wherein the out-coupling minor structures have a fixed spacing between adjacent ones of the out-coupling minor structures along a second axis of the 2D array.

10. The optical apparatus of claim 8, wherein the out-coupling minor structures have an aperiodic spacing between adjacent ones of the out-coupling minor structures along the first axis of the 2D array.

11. The optical apparatus of claim 1, wherein each of the out-coupling minor structures of the 2D array comprises:
   a first reflective surface that is non-optically transmissive and orientated to reflect the guided light as the output light for emission from the out-coupling region; and
   a second reflective surface that is non-optically transmissive and orientated to reflect the guided light for propagation further along the out-coupling region of the waveguide prior to emission from the waveguide,
   wherein the first reflective surface is orientated to form an oblique angle with the second surface of the waveguide where the output light emerges from the out-coupling region,
   wherein the second reflective surface is orientated substantially parallel to the second surface of the waveguide where the output light emerges.

12. The optical apparatus of claim 1, wherein the out-coupling mirror structures of the 2D array comprise metal reflective structures offset from one another with interstitial gaps such that the out-coupling region is partially transparent and permits external light to pass through the out-coupling region in the interstitial gaps between the out-coupling mirror structures.

13. The optical apparatus of claim 1, wherein each of the in-coupling structure has an elongated height along a first axis that is substantially equivalent to an overall height of the 2D array along the first axis.

14. The optical apparatus of claim 1, wherein the waveguide includes an intermediate region disposed between the in-coupling region and the out-coupling region for guiding the guided light between the in-coupling region and the out-coupling region via total internal reflection.

15. The optical apparatus of claim 1, wherein the waveguide further includes:
   an intermediate region disposed between the in-coupling region and the out-coupling region for guiding the guided light between the in-coupling region and the out-coupling region; and
   at least one metallic reflective layer disposed along a side of the intermediate region, wherein the intermediate region guides the guided light at least partially by reflection off of the metallic reflective layer.

16. The optical apparatus of claim 1, further comprising at least one of a light absorbing surface, an anti-reflective surface, or a light scattering surface disposed on an end region of the waveguide adjacent to the out-coupling region to inhibit the guided light from reflecting back down the waveguide towards the in-coupling region.

17. The optical apparatus of claim 1, wherein the waveguide comprises a single piece injection molded polymer element.

18. A head mounted display, comprising:
   a waveguide including:
      first and second surfaces;
      an in-coupling region for receiving input light into the waveguide and an out-coupling region for emitting output light out of the waveguide;
      at least one in-coupling structure disposed at the in-coupling region and orientated to direct the input light towards the out-coupling region as guided light guided along within the waveguide; and
      a two dimensional ("2D") array of out-coupling structures disposed at the out-coupling region and orientated to direct the guided light out of the waveguide through the second surface to an eye of the user as the output light;
   an image source positioned to launch a computer generated image into the in-coupling region of the waveguide; and
   a frame assembly to support the waveguide and the image source for wearing on a head of the user.

19. The head mounted display of claim 18, wherein the waveguide further includes a one dimensional ("1D") array of in-coupling mirror structures, including the at least one in-coupling structure, disposed at the in-coupling region.

20. The head mounted display of claim 19, wherein the 1D and 2D arrays both comprise raised mirror structures that are disposed on and rise from the first surface of the waveguide opposite to the second surface of the waveguide through which the input light is incident and the output light is emitted.

21. The head mounted display of claim 20, wherein each of the raised minor structures of at least one of the 1D array or the 2D array comprises:
   a first reflective surface orientated obliquely to the second surface; and
   a second reflective surface orientated substantially parallel to the second surface.

22. The head mounted display of claim 18,
   wherein the out-coupling structures have a variable spacing between adjacent ones of the out-coupling structures along a first axis of the 2D array, and
   wherein the out-coupling structures have a fixed spacing between adjacent ones of the out-coupling structures along a second axis of the 2D array.

* * * * *

UNITED STATES PATENT AND TRADEMARK OFFICE
CERTIFICATE OF CORRECTION

PATENT NO.        : 8,446,675 B1
APPLICATION NO.   : 13/457151
DATED             : May 21, 2013
INVENTOR(S)       : Chia-Jean Wang et al.

Page 1 of 1

It is certified that error appears in the above-identified patent and that said Letters Patent is hereby corrected as shown below:

In the Claims

In Column 10, line 19, (claim 1, line 12) delete "minor" and replace with -- mirror --.
In Column 10, line 29, (claim 3, line 2) delete "minor" and replace with -- mirror --.
In Column 10, line 42, (claim 4, line 2) delete "minor" and replace with -- mirror --.
In Column 10, line 61, (claim 8, line 2) delete "minor" and replace with -- mirror --.
In Column 10, line 62, (claim 8, line 3) delete "minor" and replace with -- mirror --.
In Column 10, line 65, (claim 9, line 2) delete "minor" and replace with -- mirror --.
In Column 10, line 66, (claim 9, line 3) delete "minor" and replace with -- mirror --.

In Column 11, line 2, (claim 10, line 2) delete "minor" and replace with -- mirror --.
In Column 11, line 3, (claim 10, line 3) delete "minor" and replace with -- mirror --.
In Column 11, line 6, (claim 11, line 2) delete "minor" and replace with -- mirror --.

In Column 12, line 36, (claim 21, line 2) delete "minor" and replace with -- mirror --.

Signed and Sealed this
Second Day of July, 2013

Teresa Stanek Rea
*Acting Director of the United States Patent and Trademark Office*